W. DESILETS.
SCRAPER.
APPLICATION FILED APR. 7, 1921.
1,402,579.
Patented Jan. 3, 1922.
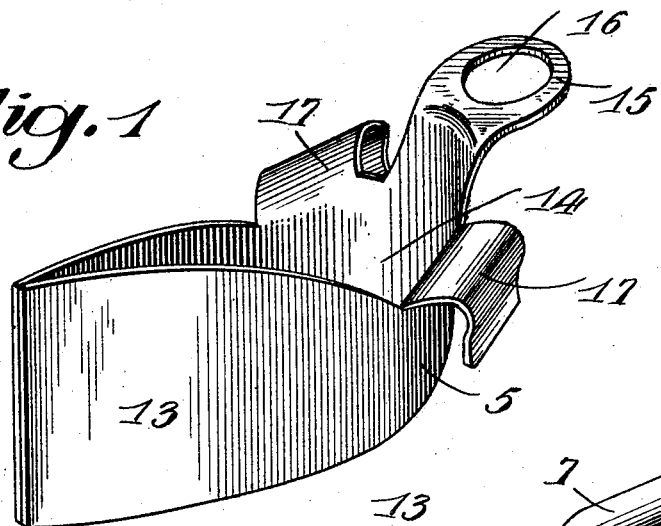
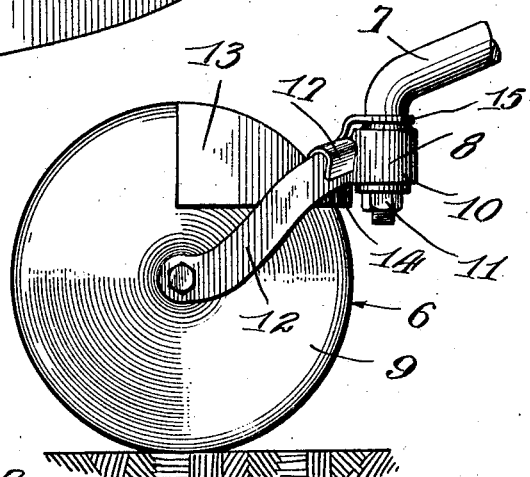
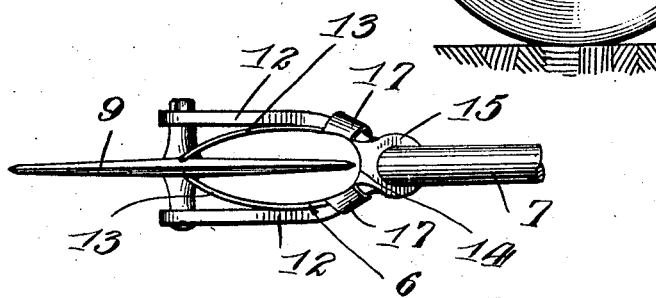
Inventor:
William Desilets
By
William Clinton
Attorney

UNITED STATES PATENT OFFICE.

WILLIAM DESILETS, OF LA FLECHE, SASKATCHEWAN, CANADA.

SCRAPER.

1,402,579.  Specification of Letters Patent.  Patented Jan. 3, 1922.

Application filed April 7, 1921. Serial No. 459,428.

*To all whom it may concern:*

Be it known that I, WILLIAM DESILETS, a subject of the King of Great Britain, residing at La Fleche, in the Province of Saskatchewan, Canada, have invented certain new and useful Improvements in Scrapers, and do hereby declare that the following is a full, clear, and exact description of the invention, such as will enable others skilled in the art to which it appertains to make and use the same.

The present invention relates to new and useful improvements in scrapers and more particularly to that class adapted for use upon coulters.

The primary object of the invention is the provision of a scraper attachment which can be applied to the usual coulter now in common use.

Another object of the invention, is the provision of means for attaching the scraper to the yoke of the coulter, so that it will engage the latter, scraping all particles of dirt and the like therefrom.

Another object of the invention is the provision of a scraper such as above mentioned, which is formed from one piece of material with means thereon for securing the same and firmly holding it in its desired operative position.

A further object of the invention is the provision of a scraper such as above referred to, adaptable to coulters of ordinary design, and which will be comparatively simple and inexpensive to manufacture, reliable and efficient in use and readily operated.

With the above and other objects in view, the present invention resides in the novel features of construction, formation, combination, and arrangement of parts to be hereinafter more fully described, claimed, and illustrated in the accompanying drawing, forming a part of the present application; and in which, Figure 1 is a detail perspective view, of the scraper removed;

Figure 2 is a side view of a coulter showing the scraper applied thereto; and,

Figure 3 is a top plan view of the mechanism illustrated in Figure 2.

Referring now to the accompanying drawings by corresponding characters of reference, throughout the several views, the numeral 5 designates in general my improved scraper which is applied, as illustrated and in a manner to be hereinafter described, to a coulter shown at 6. The coulter 6 includes the usual standard 7, the lower end of which is pivotally connected to the yoke 8, which supports the coulter disk 9. This yoke 8 comprises a sleeve 10 through which the lower end of the standard extends and in which position it is held by any suitable locking mechanism which is shown at 11. A pair of arms 12 extend from the sleeve 10 and between the free ends of these arms the disk 9 is journalled.

The scraper consists of a pair of blades 13 which engage the opposite sides of the disk 9 as clearly shown in Figures 2 and 3. These blades are connected at their rear ends by an integral piece of material shown at 14 which provides for a suitable resiliency between the said blades so they will yieldingly grasp the opposite sides of the disk 9.

The upper end of the material 14 is designed to produce a horizontally disposed tongue 15 provided with a central opening 16 formed therein, through which the standard 7 extends.

Spring gripping tongues 17 are formed upon the opposite sides of the blades 13 adjacent their connected ends, and are adapted to grip the arms 12 as clearly shown in Figures 2 and 3 for holding the blades 13 rigidly in the desired position.

It will thus be seen that a removable scraping attachment for coulters is provided which will firmly hold in position and which will fulfil all of the necessary requirements of such a device, and it would be understood in this connection, that various minor changes in the specific details of construction, can be resorted to within the scope of the appended claims without departing from the spirit or sacrificing any of the advantages of the invention.

Having thus fully described, the invention, what I claim as new and desire to protect by Letters Patent is:

1. The combination with a coulter, including a standard, a yoke, and a disk, of a scraper formed from a single piece of material, comprising blades arranged for engagement with the opposite sides of the disk, means provided upon said scraper for engaging the standard and means provided upon the blades for engaging the opposite sides of the yoke as and for the purposes set forth.

2. The combination with a coulter, including a standard, a yoke, and a disk, of a scraper including a pair of integral blades engaging opposite sides of the disk, a tongue having an opening therein through which the standard extends and side tongues formed upon the blades for engaging the sides of the yoke as and for the purposes set forth.

3. A scraper attachment for coulters, including a pair of resilient blades, an attaching tongue formed at one end of said blades, and spring gripping tongues formed upon the blades adjacent the first mentioned tongue, as and for the purposes set forth.

4. As a new article of manufacture, a scraper attachment for coulters or the like formed from a single strip of material, comprising opposite side blades, integral at one end thereof, a tongue extending from the integral portion of said blades, and having an opening therein, and spaced tongues arranged upon the opposite sides of the blades adjacent the integral portion thereof, forming gripping members as and for the purposes set forth.

In witness whereof I have hereunto set my hand.

WILLIAM DESILETS.

Witnesses:
ARTHUR GAUTHIER,
WILLIAM BERUBO.